May 2, 1961

P. D. WICKERSHAM 2,982,855

NEUTRON DETECTOR

Filed Jan. 29, 1959

PRICE D. WICKERSHAM
INVENTOR.

BY David C. Ogden
Morris Spector

ATTORNEYS

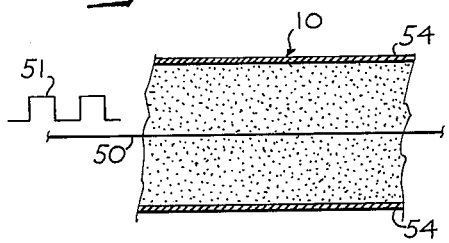
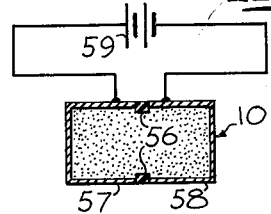
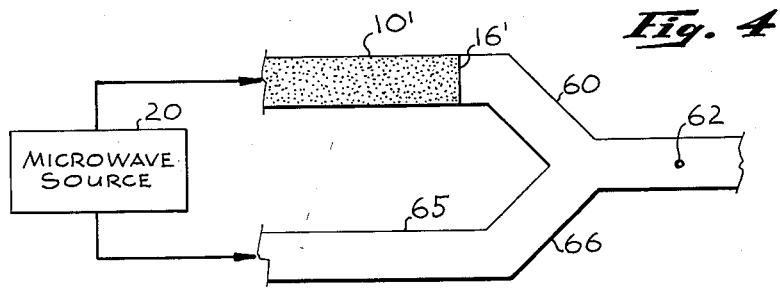
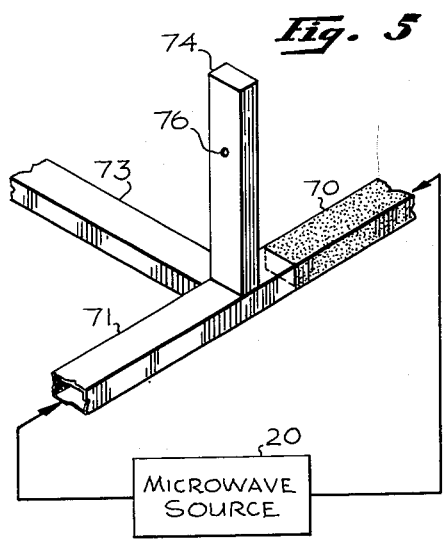
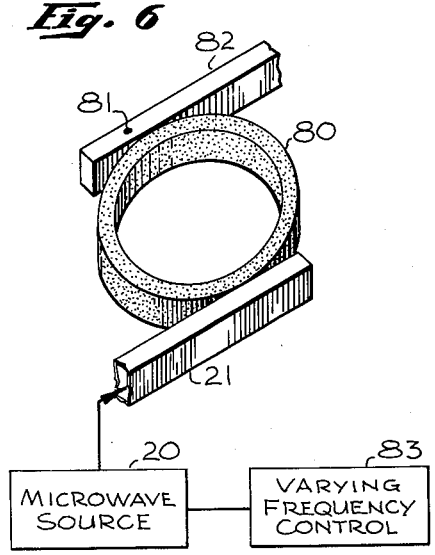
Price D. Wickersham
INVENTOR.

United States Patent Office 2,982,855
Patented May 2, 1961

2,982,855

NEUTRON DETECTOR

Price D. Wickersham, Littleton, Colo., assignor to Thompson Ramo Wooldridge Inc., Los Angeles, Calif., a corporation of Ohio Filed Jan. 29, 1959, Ser. No. 789,817

4 Claims. (Cl. 250—83.1)

This invention relates to a neutron detector and more particularly to the detection of thermal neutron flux by the use of microwave energy directed through a neutron-reactive medium and detecting the influence of the neutron reactions on the microwave energy.

In the past, one of the problems that has plagued users of nuclear reactors has been an accurate and rapidly responsive indication of neutron flux densities. It is known that the density of thermal or slow neutron flux is directly proportional to the power output of a reactor. Moreover these neutrons in the region of the reactor can be used to cause nuclear reactions which produce ions thereby increasing slightly the conductivity and the refractive index of the dielectric regime within which the ions move. The practice of employing one or more gas filled or coated ion chambers situated at supposedly sensitive locations around the reactor core provides a measure of thermal neutron flux through a small area commensurate with the size of the chambers to produce small ion currents of the order of $10^{-14}$ amperes per unit neutron flux. Obviously this magnitude of current must be amplified by electronic instrumentation for monitoring or control purposes. With the relatively small size of the individual ion chamber detection devices, any indication in a control room from a particular chamber must be considered a point indication and will obviously be influenced by relative location of control rods, experiment shadowing of the neutron flux or the effects of fuel burn-up. These phenomena will change the ion current/power relationship for any one of a plurality of these chambers. Moreover, because of the extremely small current emanating from this type of ion chamber, particularly at low flux levels, the integrating times required to produce significant changes in amplifier outputs are often undesirably long. If the chambers, or any one of them, are connected to a reactor power level control arrangement such a delay may prove dangerous.

It is also known that in the art of transmission of microwaves through a wave guide, that the transmission will be altered both in its real and imaginary components as a function of the conductivity of any gas in the transmission path. In a microwave resonant cavity, the frequency characteristics will change in response to dielectric conductivity changes.

Therefore it is a primary object of the invention to provide a microwave device containing a neutron-reactive medium whereby the propagation characteristics of the medium will change as a result of thermal neutron flux and thus influence the microwave energy.

A further object is to provide a simple and reliable thermal neutron detector which will produce an easily measurable indication of neutron flux and which will respond rapidly.

A further object is to provide an improved method of detecting thermal neutron flux.

Briefly in accordance with one aspect of this invention, a relatively long microwave guide containing neutron-reactive gas under pressure is positioned adjacent to at least one surface of a reactor. At one end of the wave guide is applied a microwave frequency electromagnetic energy, such as 3,000 mc., and at the other end is positioned a detector responsive to this energy. The wave guide filled with the neutron-reactive gas will experience changes in its conductivity, dielectric constant, and propagation constant as a result of ionization of the gas dielectric produced by thermal neutron induced reactions in the gas. Detection of these changes will provide signal information representative of the reactor flux and power.

The subject matter which is regarded as this invention is particularly pointed out and distinctly claimed in the concluding portion of this specification. The invention, however, as to its organization and method of operation, together with further objects and advantages thereof will best be understood by reference to the following description taken in connection with the accompanying drawings in which:

Fig. 2 shows a cross-section detail view of an embodiment of the form of the invention shown in Fig. 1;

Fig. 3 shows a cross-section detail view of another embodiment of the invention shown in Fig. 1;

Fig. 4 shows a simplified plan view of another embodiment of this invention;

Fig. 5 shows a simplified perspective view of another embodiment of the general type shown in Fig. 4; and Fig. 6 shows a simplified perspective view of still another embodiment of this invention.

Figure 1:
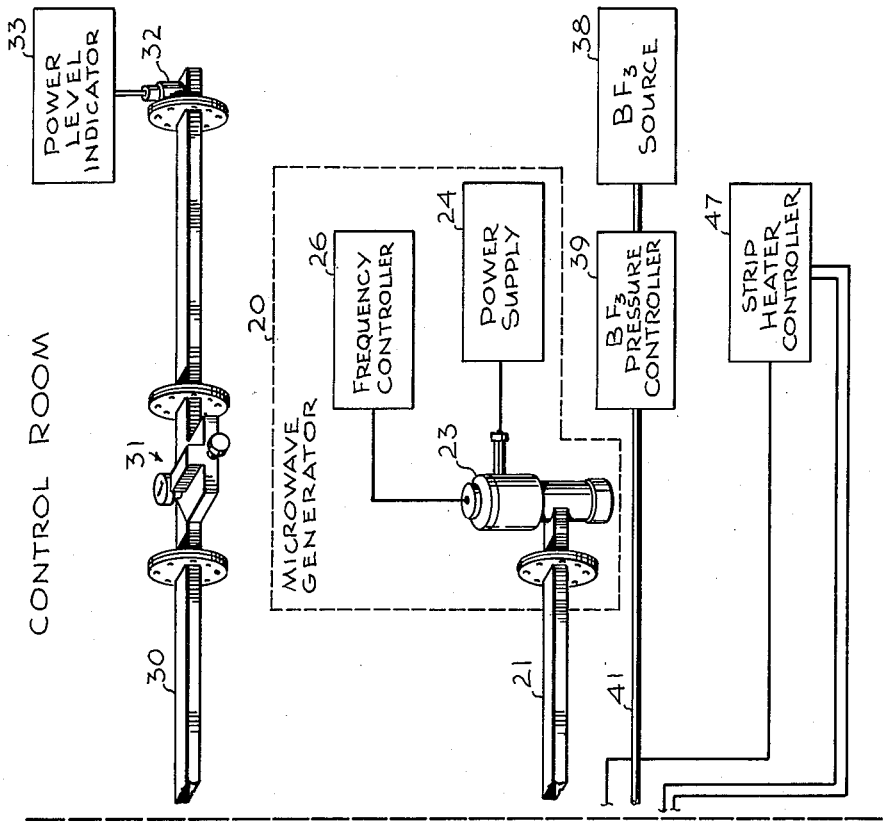
Fig. 1 shows a simplified plan view of one embodiment of this invention.
Figure 1:
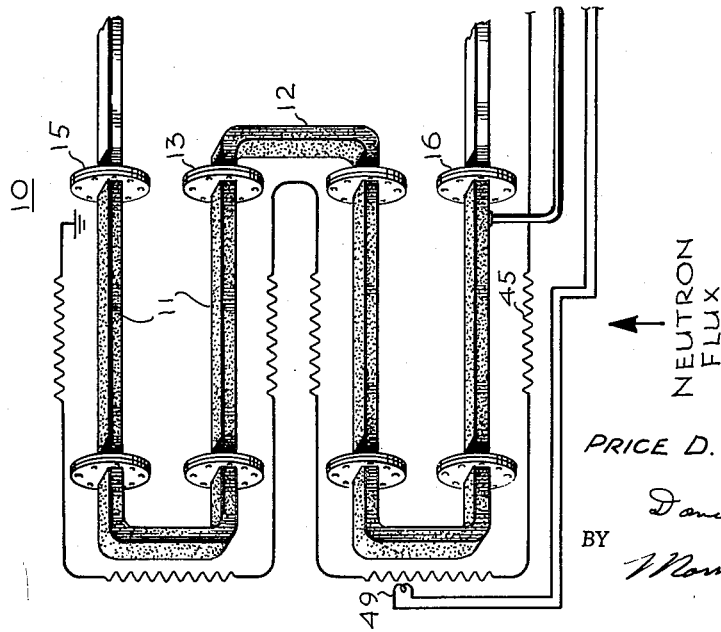

Referring now to the drawings in which like numerals designate similar parts, there is shown in Fig. 1 a wave guide grid 10 positioned in and around a core of a particular reactor and containing a neutron-reactive gas such as $BF_3$ enriched in the boron-10 isotope or $UF_6$ gas enriched in the U-235 isotope. It should be noted that since nearly one-fifth of natural boron is of the boron-10 isotope, some applications of the $BF_3$ gas will not require enrichment in boron-10. The particular wave guide grid 10 shown is composed of straight sections 11 and curved sections 12 connected by low impedance joints 13. At each end of the portion of wave guide grid 10 containing the neutron-reactive gas, are provided the pressure windows 15 and 16 of the type which are transparent to microwave frequency propagation but which will prevent substantial leakage of the gas from the interior of the wave guide 10.

A microwave source or generator 20 is connected by a wave guide section 21 to the pressure window 16. Although high energy microwaves are able to cause ionization of certain gases, the energy level of this system is substantially below that which might cause such ionization. One suitable microwave generator 20 might include a klystron 23 and a power supply 24. In certain applications of this invention the microwave generator 20 should include a frequency stabilization apparatus 26 such as the Pound circuit. Since several frequency stabilizing arrangements are known, the details of such apparatus need not be explained here. At the other end of the wave guide grid 10 is provided a detection arrangement including a connecting wave guide 30, a precision variable attenuation device 31 and a detector 32. Operably connected to the detector is a power level indicator 33. The attenuation device 31 may be used as one means of calibrating the power level indicator 33.

Each of the above-mentioned hardware items is a relatively well known piece of equipment and need not be described in detail herein. By way of example, one wave guide which is suitable for the wave guide grid construction would be an aluminum member having a rectangular cross-section of 2.84 inches by 1.34 inches and receptive of 3,000 megacycle waves (S-band) producible by the generator 20. Another suitable wave guide would transmit 10,000 megacycle waves of the X-band. Since many standard wave guides are currently in high volume production under rigid quality controls, it will probably prove most economical to use a standard size wave guide and provide a power supply having a frequency adapted for use with this standard wave guide.

In accordance with the present invention to provide a predetermined relation between neutron flux and the signal output, it is necessary to provide a predetermined number of gas molecules per unit volume within the wave guide grid 10. Also when the gas is contained in the wave guide itself there may be some leakage of gas. Thus, in addition to the use of a wave guide grid 10 placed in a position to receive neutron flux flow, there may be provided a neutron-reactive gas source 38 and pressure controller 39 connected through a conduit 41 to maintain the gas at a desired pressure. As an alternative, in certain embodiments, the neutron-reactive medium, such as gas, may be maintained in containers placed in the wave guide grid. A similar ion source would be a coating of a solid neutron-reactive medium on surfaces of (or in) the microwave conductors. If a solid coating is used, in the presence of thermal neutron flux, such materials as boron, uranium or uranium compounds would yield radiation which will cause the ionization of a dielectric such as argon, nitrogen or krypton, whereby the gas will become partially conductive and will thus influence the microwave energy propagation.

When a gas neutron-reactive medium is used, in order that the wave guide will contain a specific quantity of gas molecules per unit volume it is desirable to fill the gas container, e.g., the grid 10, to a predetermined pressure, at a predetermined gas temperature. Moreover, since the conductivity of the gas varies in proportion to the square root of the absolute temperature, in certain applications a heater strip 45 should be provided adjacent to the wave guide grid 10 and operatively connected to a heater strip controller 47. The heater strip controller 47 will provide heating of the wave guide grid 10 in accordance with a temperature sensing device 49 in the region of the wave guide grid.

It is obvious from the simplified Fig. 1 that the wave guide grid cross-section dimensions are small enough to enable the wave guide to be positioned around the reactor core and even be routed through small spaces inside the core for providing a flux averaging sensitivity. With certain reactors presently in operation the wave guide grid 10 will have straight sections 11 of at least about one meter in length. Also since flexible wave guides are known, a flexible construction may be used in a portion or all of the pressurized grid 10. In addition, if it is desired to have selective indications, the wave guide grid 10 may be compartmentalized into two or more sections with separate detectors receptive of energy from each section.

The wave guide grid 10 containing the neutron-reactive medium will experience changes in its propagation constant as a result of ionization of the gas dielectric caused by neutron flux. The neutron reaction involved is known to ion chambers wherein the gas ionization is produced in the case of $BF_3$ or boron-10 coatings by the alpha and lithium particles produced by the reaction of the boron-10 isotope and thermal neutrons. The (n, alpha) reaction with boron-10 isotope produces alpha and lithium particles which cause the ionization of the gas in the wave guide. The reaction with uranium hexafluoride is dependent upon the enrichment of the gas in uranium-235 isotope which produces fission fragments and gamma rays to cause ionization of the gas. As is known, the partially ionized gas is slightly more conductive than the non-ionized gas. As a result current flow is possible, and in the presence of microwave energy current flow will occur. Such current flow in the dielectric of a wave guide will increase the power loss and change the effective propagation constant of the wave guide. One means of detecting the change is to measure the magnitude of the output energy whereby any increase in attenuation will indicate thermal neutron flux increase.

One of the advantages of this invention is the rapid change of signal information resulting from an increase or decrease in ionization of the neutron reactive gas. However, in certain critical applications, the residence time of the gas ions may be long enough to cause undesirable delay of signal variations whereby the signal information is in accordance with the average neutron flux during the mean residence time of the ions (as contrasted with the instantaneous production rate alone). This problem of a long residence time of the ions delaying response to changes of neutron flux level may be substantially eliminated by intermittent (Fig. 2), or continuous (Fig. 3) sweeping of the charged ions and free electrons from within the wave guide grid 10 so that the ion density and resultant attenuation is caused by neutron flux only within a relatively short period of time instead of accumulative time during which the ion density will normally reach an equilibrium point between rate of production and rate of ion removal by normal diffusion.

One arrangement for sweeping gas molecules and free electrons from the wave guide grid 10 is shown in Fig. 2 wherein the grid is provided with a center wire 50 which has applied thereto a predetermined potential such as a pulsed rectangular wave 51. This potential will cause the attraction of the free electrons and the charged ions to the wire 50 or the walls 54 depending on the relative polarity of the wave 51. With this type of sweeping of charged particles the signal information may be responsive to the rate of increase from minimum to maximum signal levels between pulses or may be responsive to the average ion density. If it is desired to use a relatively slow pulse rate in the rectangular wave, an indicator can be responsive to the rate of increase.

A similar sweeping of the charged particles would be obtainable, as shown in Fig. 3, by placing insulation 56 between a pair of opposite sides 57 and 58 of the wave guide grid 10 and connecting relatively low potential source 59 therebetween. This sweeping will simply increase the diffusion of the ions.

Thus the average attenuation because of the ions in the dielectric regime will reach equilibrium at a much lower ion density with effective sweeping, and the conductivity of the gas dielectric will respond more rapidly to changes in neutron flux.

However, in many applications of the present invention, the natural equilibrium of ions between the production of charged particles and the normal diffusion, which will cause discharge of these particles, will provide a useful signal to detect the neutron flux phenomena. Normally, any reactor used to produce power will operate at a power level which is relatively stable whereby any drift of the rate of production of neutron flux will be slow compared to the residence time.

Moreover, since the sensitivity of the attenuation indication is proportional to the number of ions present, the sensitivity may be increased by increasing the pressure of the gas dielectric. At atmospheric pressure and with a residence time of one millisecond, the attenuation may be expected to be greater than 7 db per meter length of 10 cm. wave guide placed in a neutron flux field on the order of $10^{10}$ neutrons/cm.$^2$/sec.

The method of detecting thermal neutrons illustrated in Figs. 1, 2, and 3 includes the passing of a microwave through a specific length of a hollow conductor containing dielectric medium which will become conductive in the presence of thermal neutrons whereby the attenuation occurring within the hollow conductor varies as a function of the neutron flux. More generally stated, Figs. 1, 2 and 3 illustrate a method of detecting neutron flux including the steps of passing a microwave energy through a regime containing a neutron-reactive medium and detecting variation of the properties of the microwave energy because of changes occurring in the medium.

In addition to causing attenuation of the microwave energy, a change in conductivity of a dielectric medium within a wave guide changes the real part of the index of refraction of the dielectric medium and results in a change in the wave length for the microwave signal. Thus a wave guide containing a neutron-reactive gas when placed in the presence of neutron flux will cause a phase shift of the microwave signal as a function of the magnitude of the neutron flux.

One means of determining phase variation is by the use of a relatively simple interferometer as shown in Fig. 4 wherein the microwave generator 20 provides energy at a frequency such as 3,000 or 10,000 megacycles to a microwave grid 10' which contains a specific amount of neutron-reactive gas. The signal output of the grid 10' passes through a gas sealing window 16' and is conducted by a wave guide section 60 to a detector 62. A parallel signal is conducted from the microwave generator 20 through a wave guide section 65—66 to the detector 62. The detector 62 may be of the usual probe type and may be connected to provide a maximum indication when the two signals are in phase and a minimum indication when the two signals are out of phase.

In Fig. 5 is illustrated another means of detecting phase variations. This embodiment utilizes a bridge sometimes referred to as a magic-T bridge with microwave energy supplied from the microwave generator 20 to two opposite arms 70 and 71 of the magic-T. One of the arms 70 may be filled with a neutron-reactive medium to cause a variation in the phase of the energy in response to neutron flux. When the microwaves are in phase the output of arm 73 o fthe magic-T will be a maximum and the output in arm 74 of the magic-T will be a minimum. When the microwaves are out of phase in the arms 70 and 71, the output detectable in arm 74 is a maximum and the output in arm 73 is a minimum. A detector 76 in the arm 74 will provide signal information indicative of phase variation because of thermal neutrons in the neutron-reactive medium of arm 70.

Obviously, other phase detection means may be used with this invention to interpret the phase variation caused by the dielectric medium being ionized in response to neutron flux. With many of the phase sensitive detectors, it will be desirable to attenuate the microwave energy which does not pass through the neutron-reactive medium so that the attenuation by the neutron-reactive medium may be compensated for.

Another method for detecting the conductivity changes in a neutron-reactive gas is by placing the gas in some type of resonant cavity, energizing the cavity with a microwave and measuring the change in resonant frequency of the cavity. One such cavity is shown in Fig. 6 wherein the gas is contained in a microwave ring circuit oscillator 80 and energy is supplied to this oscillator from the microwave generator 20. As the neutron-reactive gas becomes ionized because of neutron flux, the apparent impedance of the ring circuit oscillator 80 will vary whereby the amount of energy it will absorb from the generator 20 will vary and the energy transmitted by the ring circuit oscillator will vary. Thus a resonant cavity may be a reflection type cavity where the ratio of the standing waves and/or the position of the standing waves of the feeder wave guides may be measured. On the other hand, the cavity may be a transmission type cavity where one measures the variation of energy flow from the cavity. This variation of energy flow from the resonant ring circuit oscillator 80 may be detected by a detector 81 positioned one-quarter wave length from the ring in a wave guide section 82. By changing the microwave generator operation and providing a varying frequency control circuit 83, the detector 81 may be used to detect the resonant frequency of the ring circuit oscillator 80 and thus provide an indication of the neutron flux. The frequency control circuit 83 may be of any well known type.

Obviously, other types of resonant cavities may be used with one type being similar to that shown in Fig. 1 wherein the end of the wave guide grid near the pressure window 16 is shunted to cause a reflection of the energy in a standing wave having a predetermined characteristic during the absence of neutron flux. Because of the frequency characteristic variation of the wave guide grid in the presence of neutron flux, reflected energy will vary with neutron flux and this variation may be detected. Also the magic-T bridge may be connected to provide a signal with energy being applied at the arm 73 and arms 70 and 71 being terminated to provide similar impedance characteristics in the absence of neutron flux, whereby neutron flux in the arm 70 will cause an imbalance of the matching and a signal will result in the detector 76 of the arm 74. Moreover, the arms 70 and 71 could be terminated with impedance matching loads. One of these loads could be the ring circuit oscillator 80 connected to the arm 70 with the neutron-reactive medium being in the ring circuit oscillator instead of in the arm 70.

While there are shown and described several embodiments of this invention, other modifications may occur to those skilled in the art. For instance, in using a wave guide grid of the type shown in Fig. 1, terminated to provide standing waves, it is possible to detect with various probes, the location of maximum and minimum energy levels whereby the conductivity of the neutron-reactive medium will vary the signal information received at the probes. Moreover, the use of energy at substantially lower frequencies than those specifically referred to will not change materially the method of operation of this invention. For instance, when using energy at frequencies on the order of 20 mc./s., a coaxial cable system may be employed. In addition, it may be desirable to provide other gases than those specifically mentioned above, such as carbon dioxide, in the dielectric medium to improve the physical or electronic characteristics thereof while maintaining a standard volume of ionizable gas. It is intended, therefore, by the appended claims to cover all such modifications as wall within the true spirit and scope of the present invention.

I claim:

1. Apparatus to provide information about a nuclear reactor by detecting the effects of neutron flux from the reactor on the electrical characteristics of microwave energy, said apparatus comprising: a wave guide receptive of microwave energy at one end thereof and positioned in the reactor's neutron flux region; means for containing in a section of said wave guide a predetermined amount of neutron-reactive gas whose conductivity and dielectric constant values vary according to the amount of neutron flux incident thereon, said means being adapted to pass microwave energy therethrough; and detector apparatus coupled to said wave guide at the other end thereof for measuring the extent of changes in the electrical characteristics of the microwave energy propagated through said wave guide, thereby providing a measure of the neutron flux density from the reactor.

2. The apparatus defined in claim 1 wherein said apparatus further includes heater means for maintaining the temperature of said gas within a predetermined range of temperatures, said heater means including a heater strip positioned adjacent said gas containing wave guide section.

3. Apparatus to provide information about a nuclear reactor by detecting the effects of neutron flux from the reactor on the electrical characteristics of microwave energy, said apparatus comprising: a length of wave guide receptive to microwave energy at one end thereof and positioned in the reactor's neutron flux region, said wave guide length including a section enclosed by pressure windows that are transparent to the propagation of microwave energy; means for injecting a neutron-reactive gas into said wave guide section, the conductivity and dielectric constant of said gas varying according to the amount of neutron flux incident thereon, detection means coupled to the other end of said wave guide length for measuring the attenuation of the microwave energy propagated therethrough resulting from changes in gas conductivity; and control means for maintaining said gas within predetermined temperature and pressure ranges to provide accurate measurements.

4. Apparatus to provide information about a nuclear reactor by detecting the effects of neutron flux from the reactor on the electrical characteristics of microwave energy, said apparatus comprising: a length of wave guide receptive of microwave energy at one end thereof and positioned in the reactor's neutron flux region, said wave guide length including a section enclosed by pressure windows that are transparent to the propagation of microwave energy; means for injecting a neutron-reactive gas into said wave guide section, the conductivity and dielectric constant of said gas varying according to the amount of neutron flux incident thereon, detection means coupled to the other end of said wave guide length for measuring the change in frequency of the microwave energy propagated therethrough resulting from changes in the dielectric constant of said gas; and control means for maintaining said gas within predetermined temperature and pressure ranges to provide accurate measurements.

References Cited in the file of this patent

UNITED STATES PATENTS

| | | |
|---|---|---|
| 2,756,345 | Replogle et al. | July 24, 1956 |
| 2,801,389 | Linder | July 30, 1957 |
| 2,819,450 | Towmes | Jan. 7, 1958 |
| 2,856,589 | Kazan | Oct. 14, 1958 |

UNITED STATES PATENT OFFICE
CERTIFICATE OF CORRECTION

Patent No. 2,982,855 May 2, 1961

Price D. Wickersham

It is hereby certified that error appears in the above numbered patent requiring correction and that the said Letters Patent should read as corrected below.

Column 6, line 71, for "receptive to" read -- receptive of --.

Signed and sealed this 10th day of October 1961.

(SEAL)
Attest:

ERNEST W. SWIDER
Attesting Officer

DAVID L. LADD
Commissioner of Patents

USCOMM-DC